(12) United States Patent
Park

(10) Patent No.: US 12,117,104 B1
(45) Date of Patent: Oct. 15, 2024

(54) MULTI JOINT NUT

(71) Applicant: DUKSHIN CORP., LTD., Incheon (KR)

(72) Inventor: Chanil Park, Incheon (KR)

(73) Assignee: DUKSHIN CORP., LTD., Incheon (KR)

( * ) Notice: Subject to any disclaimer, the term of this patent is extended or adjusted under 35 U.S.C. 154(b) by 0 days.

(21) Appl. No.: 18/743,034

(22) Filed: Jun. 13, 2024

(30) Foreign Application Priority Data

Jan. 25, 2024 (KR) .................. 10-2024-0011384

(51) Int. Cl.
*F16L 19/02* (2006.01)
*B65D 47/12* (2006.01)

(52) U.S. Cl.
CPC ............ *F16L 19/02* (2013.01); *B65D 47/123* (2013.01)

(58) Field of Classification Search
CPC ................................ F16L 19/02; B65D 47/123
See application file for complete search history.

(56) References Cited

U.S. PATENT DOCUMENTS

| | | | | |
|---|---|---|---|---|
| 3,980,211 A * | 9/1976 | Owens | ................. | B65D 47/123 |
| | | | | 222/562 |
| 9,598,200 B2 * | 3/2017 | Lee | ..................... | B65D 1/0246 |
| 11,964,797 B1 * | 4/2024 | Burns, Jr. | ............ | B65D 47/122 |
| 2014/0291360 A1 * | 10/2014 | Bracha | ................. | B65D 47/122 |
| | | | | 222/570 |
| 2015/0353247 A1 * | 12/2015 | Isogai | ................. | B65D 47/106 |
| | | | | 215/252 |
| 2020/0385178 A1 * | 12/2020 | Shimada | ............. | B65D 47/123 |
| 2024/0199288 A1 * | 6/2024 | Taylor | ................. | B65D 47/123 |

FOREIGN PATENT DOCUMENTS

| | | |
|---|---|---|
| KR | 20-0240364 Y1 | 10/2001 |
| KR | 20-0396594 Y1 | 9/2005 |
| KR | 10-0605634 B1 | 7/2006 |
| KR | 10-2018-0130262 A | 12/2018 |
| WO | 2009-121192 A1 | 10/2009 |

* cited by examiner

*Primary Examiner* — James M Hewitt, II
(74) *Attorney, Agent, or Firm* — You & IP, LLC

(57) ABSTRACT

A multi-joint nut configured such that a first nut part having a center portion provided with a first fastening part and a second nut part having a center portion provided with a second fastening part are coupled to each other, the multi-joint nut being easily manufactured and being configured such that the first nut part or the second nut part that matches a diameter of a coupling part of a fastening object is capable of being selectively coupled. Furthermore, the multi-joint nut may include the first nut part which is provided with the first fastening part and which has a mounting part that forms a space part, and may include a second nut part which is formed in a ring shape and provided with the second fastening part.

3 Claims, 9 Drawing Sheets

MULTI JOINT NUT

CROSS REFERENCE TO RELATED APPLICATION

The present application claims priority to Korean Patent Application No. 10-2024-0011384, filed Jan. 25, 2024, the entire contents of which are incorporated herein for all purposes by this reference.

BACKGROUND OF THE INVENTION

Field of the Invention

The present disclosure relates to a multi-joint nut. More particularly, the present disclosure relates to a multi-joint nut configured such that a first nut part having a center portion provided with a first fastening part and a second nut part having a center portion provided with a second fastening part are coupled to each other, the multi-joint nut being easily manufactured and being configured such that the first nut part or the second nut part that matches a diameter of a coupling part of a fastening object is capable of being selectively coupled.

Description of the Related Art

A portable fuel container, so-called a jerry can or a petroleum container, is a plastic container structure, and is standardized to be 10 liters or 20 liters.

The portable fuel container is used when refueling is manually performed into various small facilities at a civil engineering site, into small equipment such as a generator, or into a stove, a boiler, and so on.

Such a portable fuel container is useful when there is no gas station nearby or when it is difficult to frequently go to a gas station.

However, when a conventional portable fuel container that is widely used currently is used to perform refueling into various small facilities at a civil engineering site, into small equipment such as a generator, or into a stove, a boiler, and so on, the refueling is required to be performed by carrying the portable fuel container, so that it is difficult and inconvenient to perform a refueling operation.

Particularly, when refueling is performed into a small refueling port of such a stove and so on by using the conventional portable fuel container, not only it is inconvenient to perform the refueling by oneself, but also there is a problem that fuel loss is caused and environmental pollution is caused by fuel since fuel may be spilled when the refueling is performed.

In order to connect a pump or a nozzle to an inlet port of such a portable fuel container, a multi-joint nut is required to be provided.

However, since the size of the inlet port is different from the size of each standard size of the portable fuel container, there was a hassle of having to be provided with a number of multi-joint nuts suitable for various inlet port sizes.

Therefore, although Korean Utility Model No. 20-0396594 and Korean Patent No. 10-0605634 have been published as conventional technologies, a part to which an inlet port is coupled has a narrow gap, so that there are problems that manufacturing is difficult to be performed and the manufacturing cost is increased since a thread part is difficult to be processed.

DOCUMENT OF RELATED ART (Patent Document 1) Korean Utility Model No. 20-0396594
(Patent Document 2) Korean Patent No. 10-0605634

SUMMARY OF THE INVENTION

Accordingly, the present disclosure has been made keeping in mind the above problems occurring in the related art, and an objective of the present disclosure is to provide a multi-joint nut configured such that a first nut part having a center portion provided with a first fastening part and a second nut part having a center portion provided with a second fastening part are coupled to each other, the multi-joint nut being easily manufactured and being configured such that the first nut part or the second nut part that matches a diameter of a coupling part of a fastening object is capable of being selectively coupled.

In addition, another objective of the present disclosure is to provide a multi-joint nut configured such that a first nut part having a first fastening part and a second nut part having a second fastening part are respectively manufactured and then coupled to each other, the multi-joint nut being configured such that threads of each nut part are capable of being easily formed.

In addition, still another objective of the present disclosure is to provide a multi-joint nut configured such that a vertical groove part is formed in a first nut part and a vertical protrusion part is formed on a second nut part so that a rotational force applied to the first nut part is capable of being transmitted to the second nut part since the vertical protrusion part is fitted and coupled to the vertical groove part when the first nut part and the second nut part are coupled to each other.

In addition, yet another objective of the present disclosure is to provide a multi-joint nut configured such that a horizontal groove part is formed in a first nut part and a horizontal protrusion part is formed on a second nut part so that the first nut part and the second nut part are capable of being rigidly coupled to each other as the horizontal protrusion part is fitted and coupled to the horizontal groove part when the first nut part and the second nut part are coupled to each other.

In order to achieve the above objectives, according to the present disclosure, there is provided a multi-joint nut configured such that a corresponding first fastening part or a corresponding second fastening part is capable of being selected and fastened according to different diameters of coupling parts of a fastening object, the multi-joint nut including: a first nut part having a center portion provided with the first fastening part which has threads and which is provided on a penetrated inner circumferential surface of the first nut part, the first nut part having a mounting part which is spaced apart by a predetermined distance outside the first fastening part and which forms a space part; and a second nut part formed in a ring shape and provided with the second fastening part which has threads and which is provided on an inner circumferential surface of the second nut part, the second nut part being inserted into and coupled to the space part of the first nut part.

In addition, a flange may protrude in a central axis direction on an upper end portion of the second nut part.

In addition, the first nut part may have a plurality of vertical groove parts formed at a predetermined interval on an outer circumferential surface of the space part, and the second nut part may have a plurality of vertical protrusion parts which correspond to the vertical groove parts and which protrude on an outer circumferential surface of the second nut part.

In addition, the first nut part may have a plurality of horizontal groove parts formed at a predetermined interval on the outer circumferential surface of the space part, and the second nut part may have a plurality of horizontal protrusion parts which correspond to the horizontal groove parts and which protrude on the outer circumferential surface of the second nut part.

In addition, the horizontal protrusion parts may include inclined surfaces having a downward slope from top to bottom.

In addition, a support protrusion part may protrude on an outer circumferential surface of the mounting part.

In addition, a packing groove may be formed in an inner upper end of the first fastening part.

In addition, a packing groove may be formed in an outer upper end of the first fastening part.

According to the present disclosure, in the multi-joint nut configured such that the corresponding first fastening part or the corresponding second fastening part is capable of being selected and fastened according to different diameters of the coupling parts of the fastening object, the multi-joint nut is formed by coupling the first nut part having the center portion provided with the first fastening part to the second nut part having the second fastening part, so that there are excellent effects that manufacturing of the multi-joint nut is easily performed and the first nut part or the second nut part that matches the diameter of the coupling part of the fastening object is capable of being selectively coupled.

In addition, in the present disclosure, the first nut part having the first fastening part and the second nut part having the second fastening part are respectively manufactured and then coupled to each other, so that there is an additional effect that threads of each nut part are capable of being easily formed.

In addition, in the present disclosure, the vertical groove part is formed in the first nut part and the vertical protrusion part is formed on the second nut part, so that there is an additional effect that the rotational force applied to the first nut part is capable of being transmitted to the second nut part since the vertical protrusion part is fitted and coupled to the vertical groove part when the first nut part and the second nut part are coupled to each other.

In addition, in the present disclosure, the horizontal groove part is formed in the first nut part and the horizontal protrusion part is formed on the second nut part, so that there is an additional effect that the first nut part and the second nut part are capable of being rigidly coupled to each other as the horizontal protrusion part is fitted and coupled to the horizontal groove part when the first nut part and the second nut part are coupled to each other.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Embodiments of the present disclosure are illustrated for the purpose of explaining the technical concept of the present disclosure. The right scope of the present disclosure is not limited to embodiments suggested hereinbelow or detailed descriptions of these embodiments.

All technical terms and scientific terms used in the present disclosure have meanings normally understood by those skilled in the art to which the present disclosure belongs unless otherwise defined. All terms used in the present disclosure are selected for the purpose of explaining the present disclosure more clearly, and are not selected to limit the right scope of the present disclosure.

It should be understood that the terms "comprises", "includes", "has" used in the present disclosure are open-ended terms that have possibility of including other embodiments unless phrases or sentences including corresponding expressions indicate otherwise.

The singular forms used in the present disclosure include the plural forms as well unless the context clearly indicates otherwise, and this is equally applied to the singular forms described in the claims.

Hereinafter, an exemplary embodiment of a multi-joint nut according to the present disclosure will be described in detail with reference to the accompanying drawings.

Figure 1:
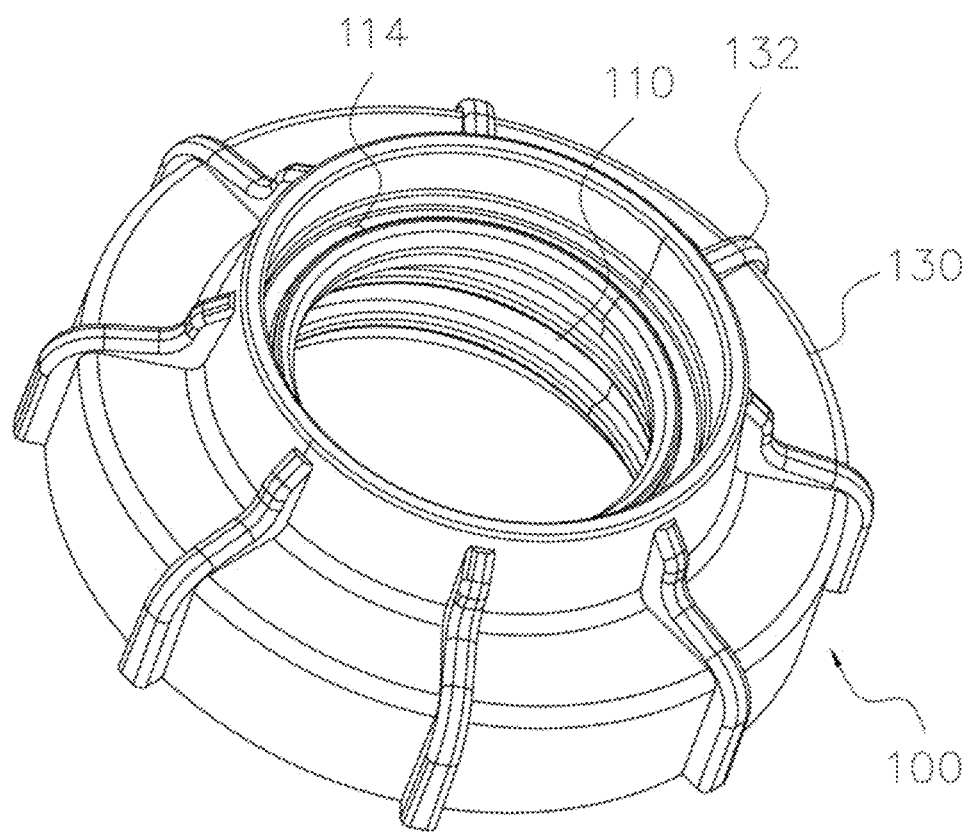
FIG. 1 is a perspective view illustrating a multi-joint nut according to the present disclosure.
Figure 2:
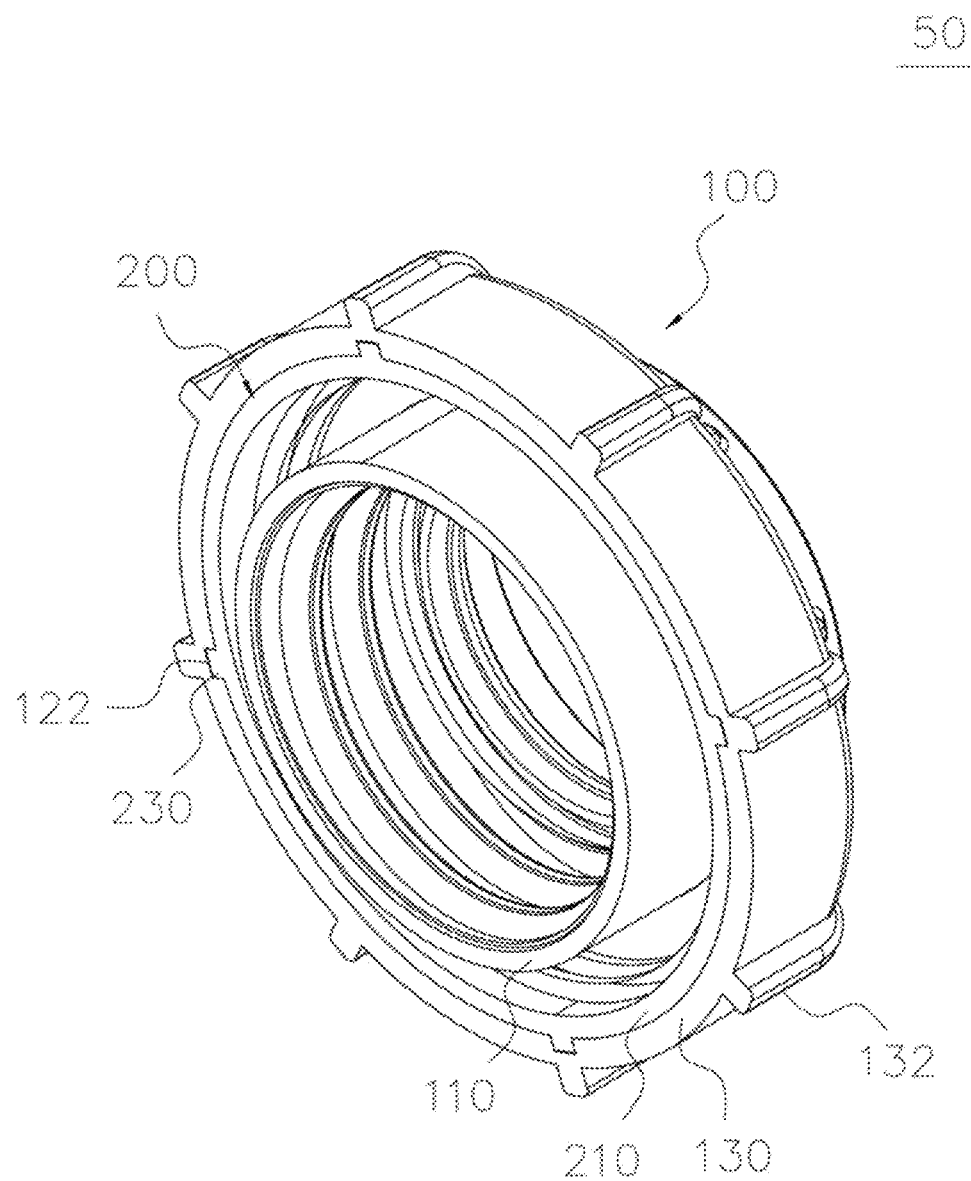
FIG. 2 is a bottom perspective view illustrating the multi-joint nut according to the present disclosure.
Figure 3:
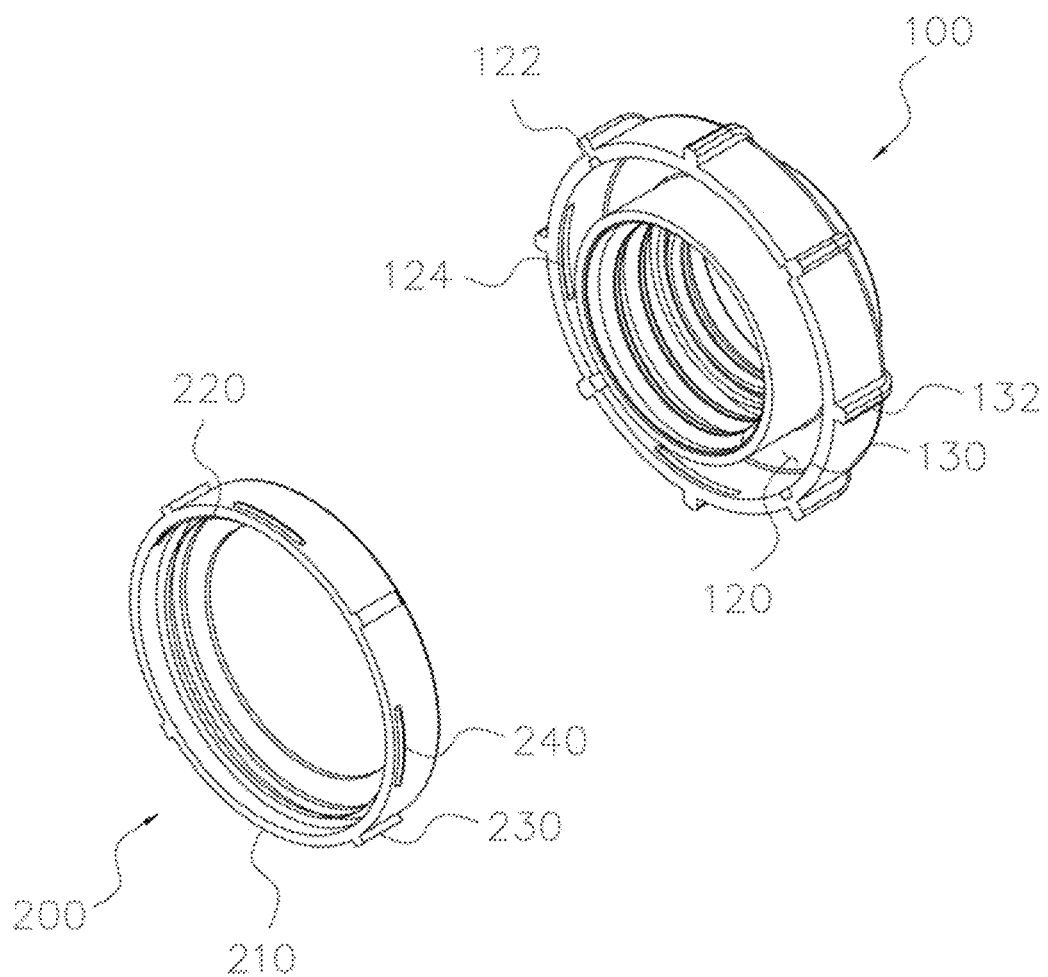
FIG. 3 is a bottom exploded perspective view illustrating the multi-joint nut according to the present disclosure.
Figure 4:
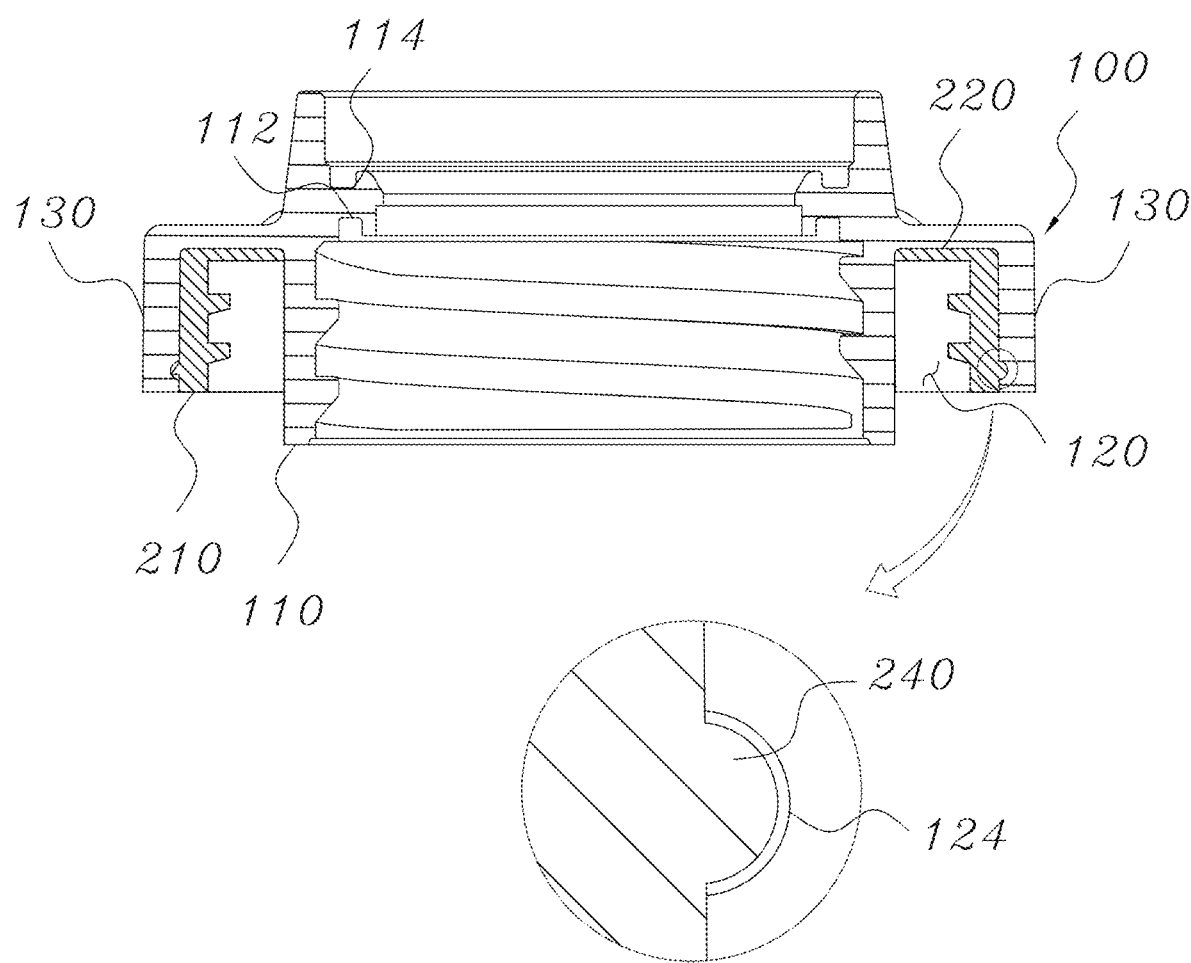
FIG. 4 is a cross-sectional view illustrating the multi-joint nut according to the present disclosure.
Figure 5:
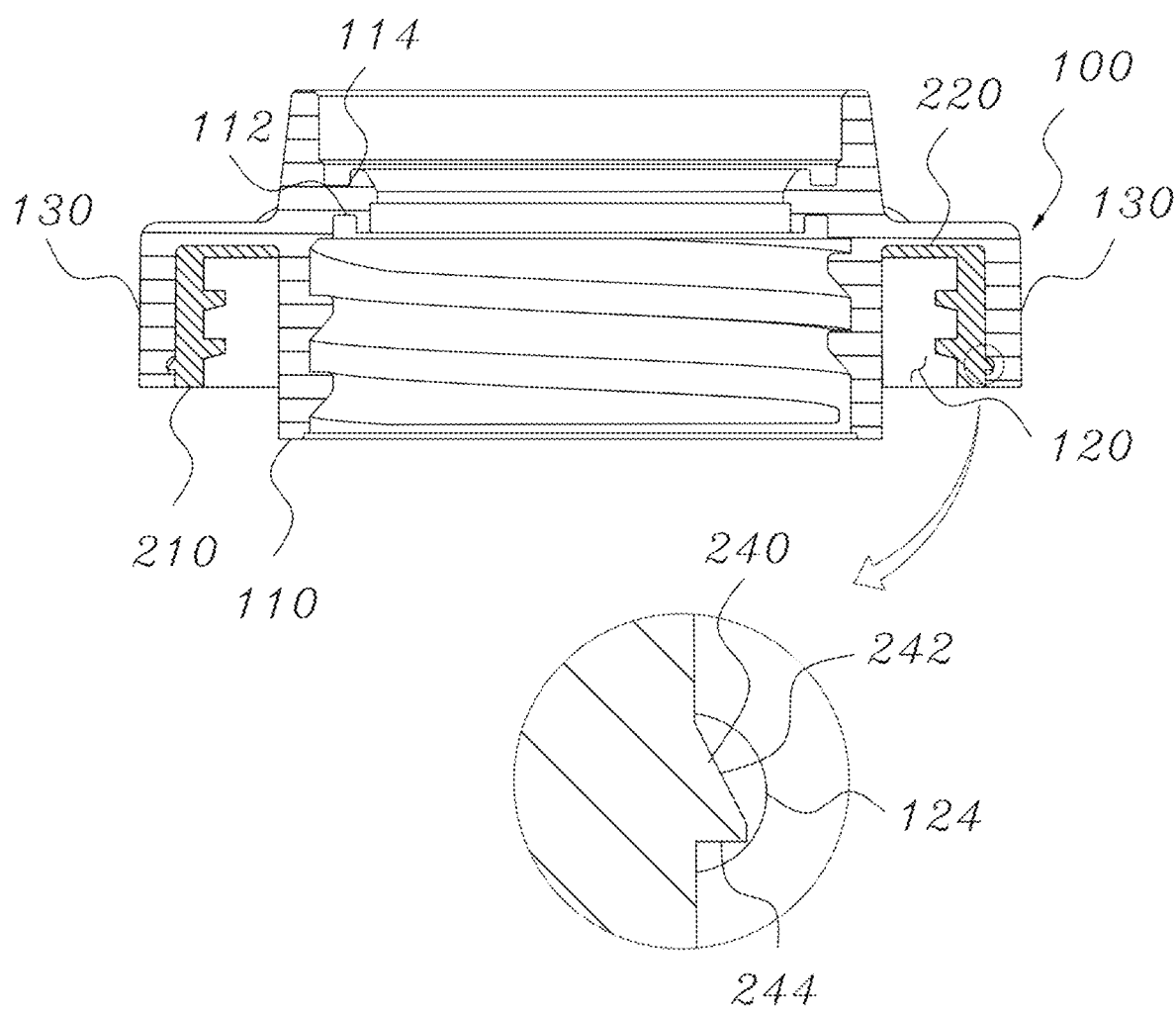
FIG. 5 is a cross-sectional view illustrating the multi-joint nut according to another embodiment of the present disclosure.
Figure 6:
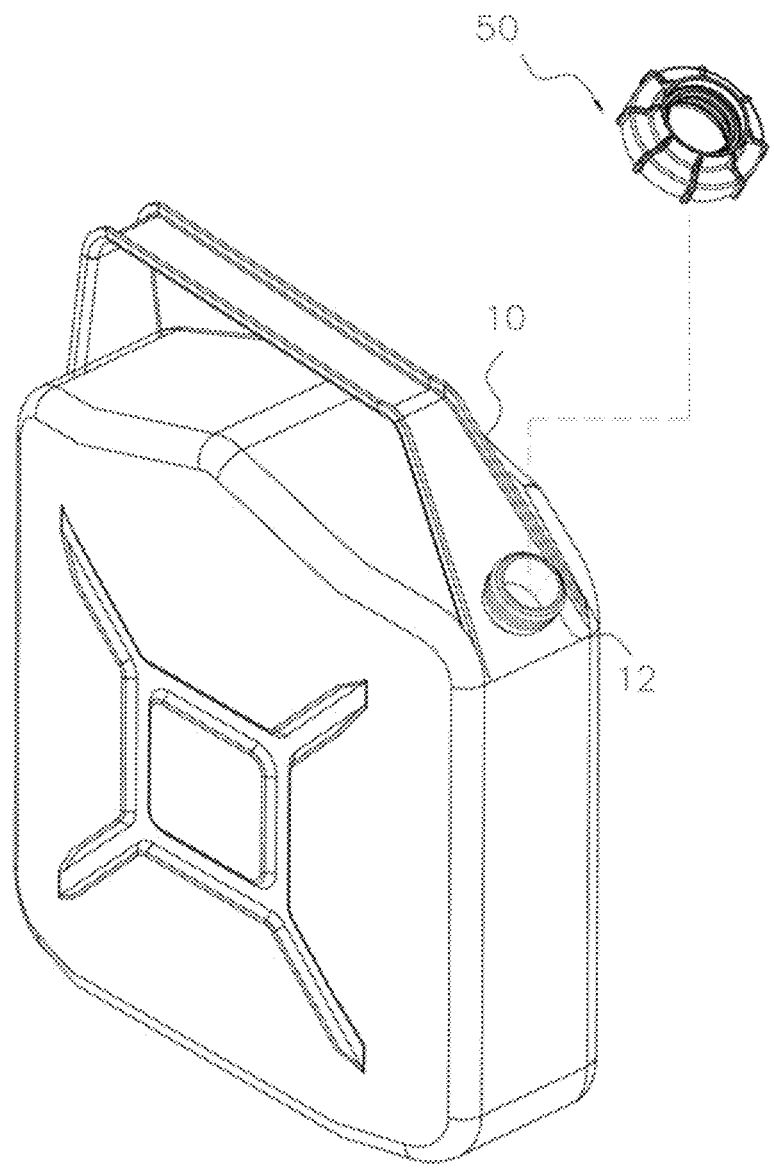
FIG. 6 and FIG. 7 are views illustrating a use state of a first nut part of the multi-joint nut according to the present disclosure.
Figure 7:
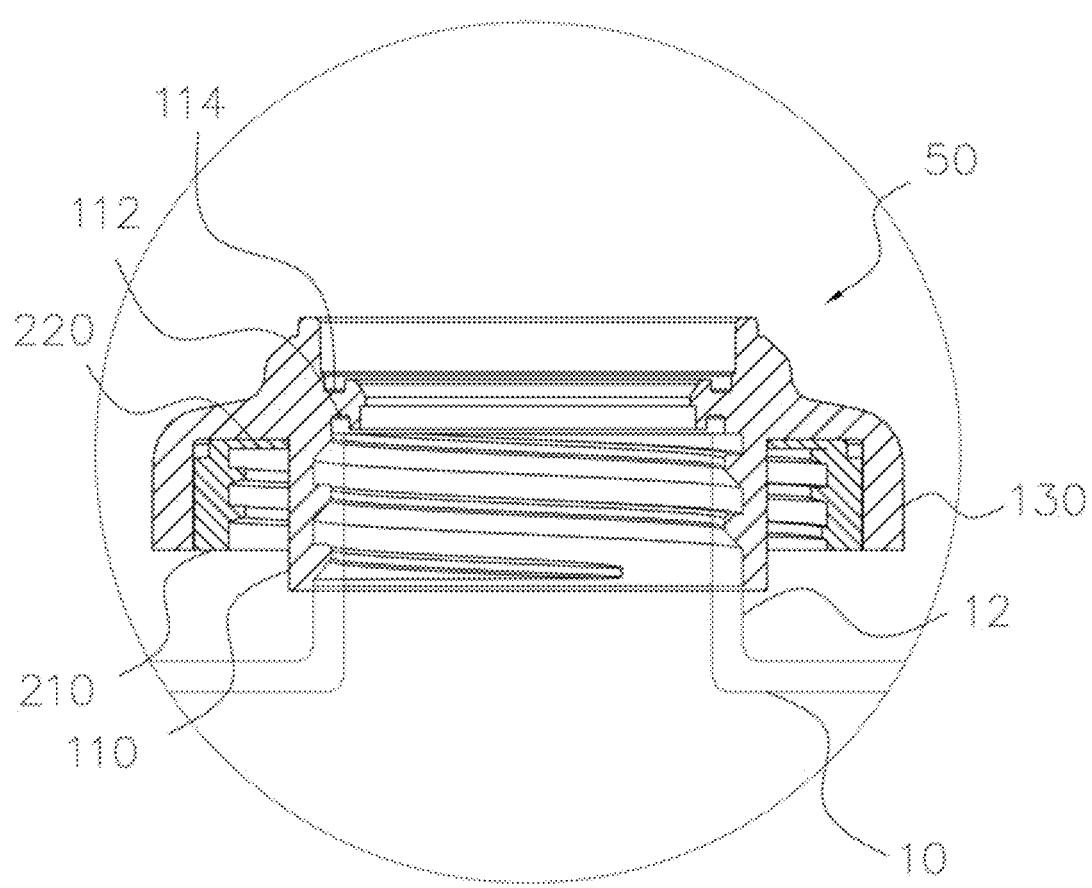
Figure 8:
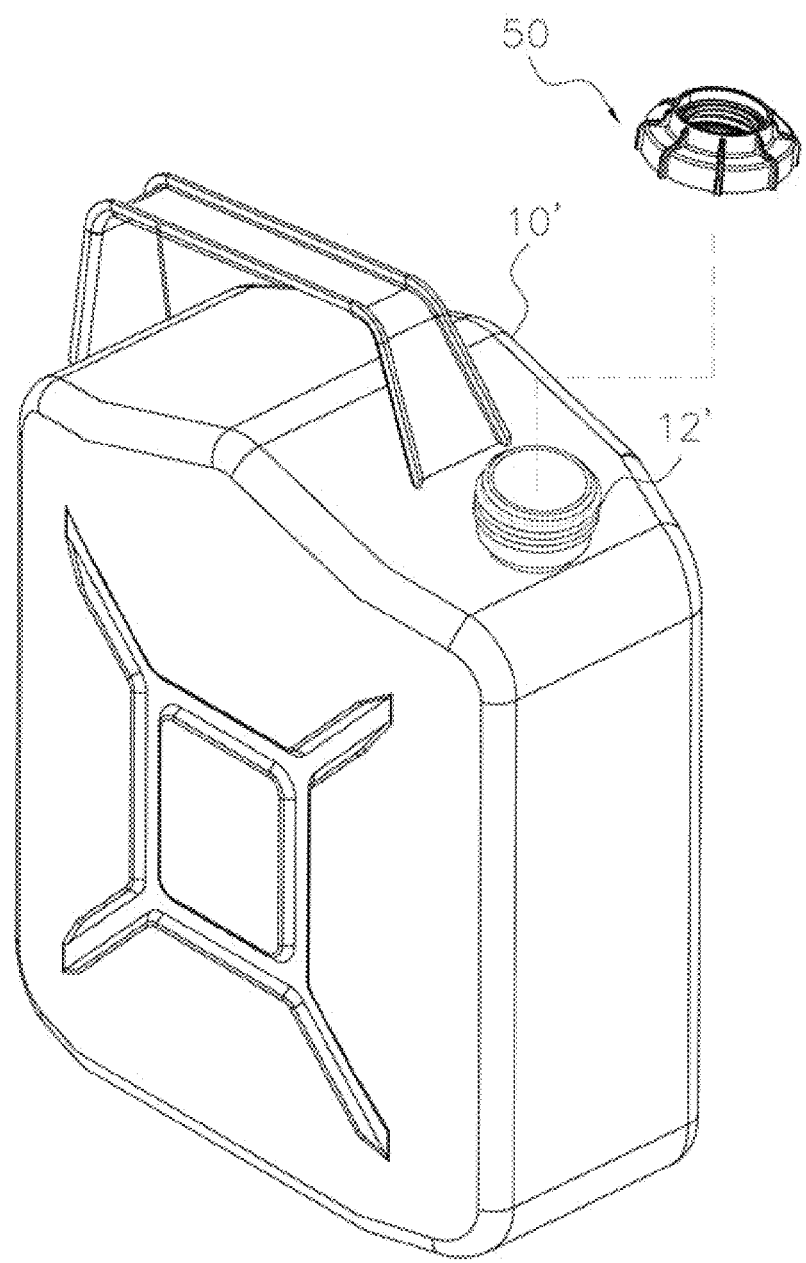
FIG. 8 and FIG. 9 are views illustrating a use state of a second nut part of the multi-joint nut according to the present disclosure.
Figure 9:
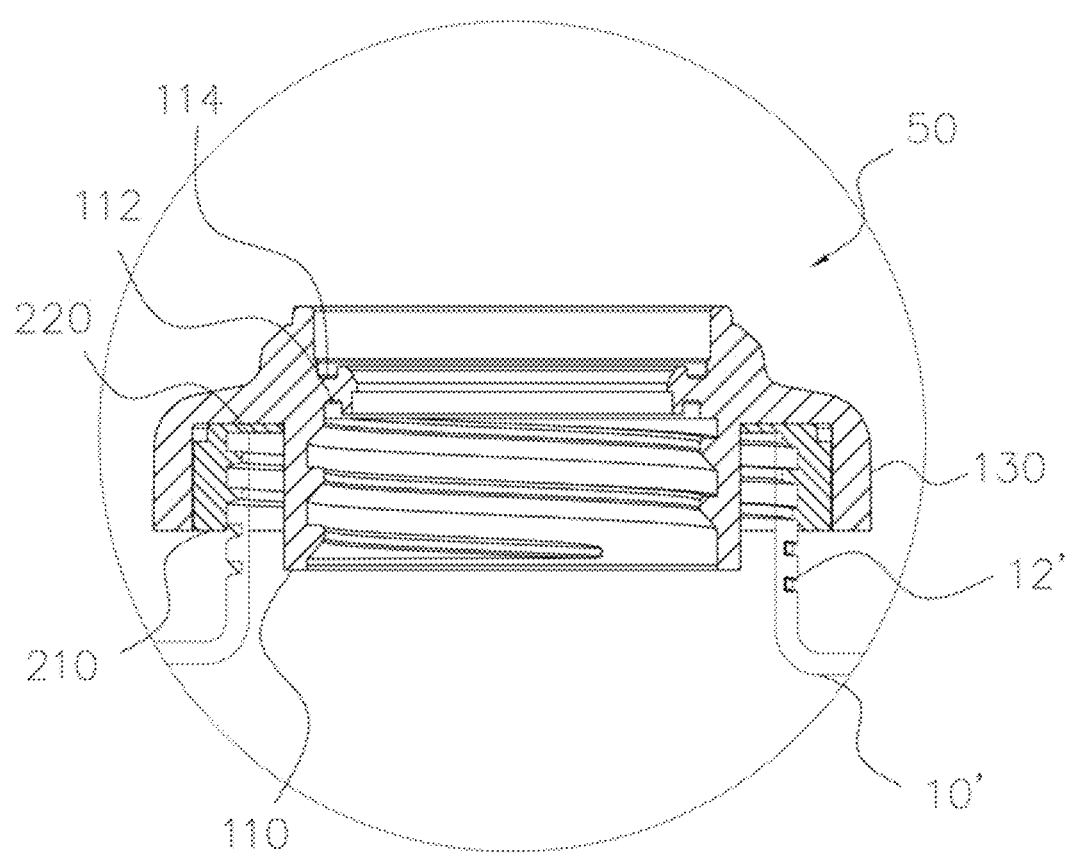

FIG. 1 is a perspective view illustrating a multi-joint nut according to the present disclosure, FIG. 2 is a bottom perspective view illustrating the multi-joint nut according to the present disclosure, FIG. 3 is a bottom exploded perspective view illustrating the multi-joint nut according to the present disclosure, FIG. 4 is a cross-sectional view illustrating the multi-joint nut according to the present disclosure, FIG. 5 is a cross-sectional view illustrating the multi-joint nut according to another embodiment of the present disclosure, FIG. 6 and FIG. 7 are views illustrating a use state of a first nut part of the multi-joint nut according to the present disclosure, and FIG. 8 and FIG. 9 are views illustrating a use state of a second nut part of the multi-joint nut according to the present disclosure.

The present disclosure relates to a multi-joint nut 50 configured such that a first nut part having the center portion provided with a first fastening part and a second nut part having a center portion provided with a second fastening part are coupled to each other, the multi-joint nut 50 being easily manufactured and being configured such that the first nut part or the second nut part that matches the diameter of a coupling part of a fastening object is capable of being selectively coupled. As illustrated in FIG. 1 to FIG. 4, in the configuration of the multi-joint nut 50, the multi-joint nut 50 may include a first nut part 100 provided with a first fastening part 110 which has threads and which is provided on a penetrated inner circumferential surface of the center portion of the first nut part 100, the first nut part 100 being provided with a mounting part 130 which is spaced apart by a predetermined distance outside of the first fastening part 110 and which forms a space part 120. Furthermore, the multi-joint nut 50 may include a second nut part 200 provided with a second fastening part 210 and formed in a ring shape, the second fastening part 210 having threads and being provided on an inner circumferential surface of the second nut part 200. Furthermore, the second nut part 200 is configured to be inserted into the space part 120 of the first nut part 100.

Here, the fastening object may be a container in which a fluid is accommodated therein, and may preferably be a portable fuel container.

In more detail, the center portion of the first nut part 100 is penetrated, and the first fastening part 110 having the threads may be provided on the penetrated inner circumferential surface of the first nut part 100.

In addition, the mounting part 130 may be formed such that the mounting part 130 is spaced apart by the predetermined distance outside the first fastening part 110, and the space part 120 may be formed between the first fastening part 110 and the mounting part 130.

Here, the space part 120 is formed such that the lower portion of the space part 120 is open.

Meanwhile, the second nut part 200 is configured to be inserted into and coupled to the space part 120, and the second fastening part 210 having the threads may be formed on the inner circumferential surface of the second nut part 200.

At this time, the inner diameter of the second fastening part 210 is formed larger than the inner diameter of the first fastening part 110, and the outer circumferential surface of the second fastening part 210 may be closely coupled to the outer circumferential surface of the space part 120.

In addition, in the first nut part 100, a plurality of vertical groove parts 122 may be formed at a predetermined interval on the outer circumferential surface of the space part 120. Furthermore, a plurality of vertical protrusion parts 230 corresponding to the vertical groove parts 122 may protrude on the outer circumferential surface of the second nut part 200.

Therefore, when the first nut part 100 and the second nut part 200 are coupled to each other, the vertical protrusion parts 230 are coupled to the vertical groove parts 122, so that the first nut part 100 and the second nut part 200 are capable of being rotated simultaneously as a rotational force applied to the first nut 100 is transmitted to the second nut part 200.

In addition, in the first nut part 100, a plurality of horizontal groove parts 124 may be formed at a predetermined interval on the outer circumferential surface of the space part 120. Furthermore, a plurality of horizontal protrusion parts 240 corresponding to the horizontal groove parts 124 may protrude on the outer circumferential surface of the second nut part 200.

Therefore, when the first nut part 100 and the second nut part 200 are coupled to each other, the horizontal protrusion parts 240 are coupled to the horizontal groove parts 124, and the second nut part 200 is prevented from being arbitrarily separated from the space part 120, so that a coupled state is capable of being solidly maintained.

At this time, as illustrated in FIG. 5, the horizontal protrusion part 240 may include an inclined surface 242 having a downward slope from top to bottom.

Therefore, when the horizontal protrusion part 240 is coupled to the horizontal groove part 124, the horizontal protrusion part 240 is guided to the horizontal groove part 124 by the inclined surface 242 so that coupling is capable of being easily realized. Furthermore, in a state in which the horizontal protrusion part 240 is coupled to the horizontal groove part 124, by a protruded lower end step 244 of the horizontal protrusion part 240, the horizontal protrusion part 240 is prevented from being arbitrarily separated from the horizontal groove part 124, so that a solidly coupled state is capable of being maintained.

Meanwhile, a flange 220 may protrude in a central axis direction on the upper end portion of the second nut part 200. Therefore, as the flange 220 is formed, there is an effect that the second nut part 200 has rigidity comparing to the second nut part 200 that is simply formed in the ring shape.

At this time, in a state in which the second nut part 200 is coupled to a coupling part 12' of a fastening object 10', the flange 220 is seated on an upper end edge of the coupling part 12', so that the second nut part 200 is prevented from being rotated more than a predetermined amount of rotation.

That is, in a situation in which the flange 220 is not formed on the second nut part 200, when the second nut part 200 is coupled to the coupling part 12' of the fastening object 10', an inner upper end of the space part 120 of the first nut part 100 is in contact with the upper end edge of the coupling part 12'. Furthermore, when the multi-joint nut 50 of the present disclosure is rotated, the second nut part 200 is excessively coupled to the coupling part 12', and the coupling part 12' pushes the first nut part 100, so that there is a problem that the coupling between the first nut part 100 and the second nut part 200 is released and the first nut part 100 and the second nut part 200 are separated from each other occurs.

Meanwhile, the inner side of the flange 220 is formed such that the diameter of the inner side of the flange 220 corresponds to the diameter of the outer circumferential surface of the first fastening part 110. Therefore, when the first nut part 100 and the second nut part 200 are coupled to each other, by the flange 220, the second nut part 200 is not moved within the space part 120 of the first nut part 100, so that there is an effect that the rigidly coupled state is capable of being maintained.

Therefore, according to the configuration as described above, as illustrated in FIG. 6 to FIG. 9, since the corresponding first and second fastening parts 110 and 210 are selected according to the coupling parts 12 and 12' of the fastening objects 10 and 10' having different diameters from each other, the first and second fastening parts 110 and 210 are capable of being mounted on the fastening objects 10 and 10' having the coupling parts 12 and 12' that have various diameters.

In addition, in the present disclosure, the first nut part 100 having the first fastening part 110 and the second nut part 200 having the second fastening part 210 are respectively manufactured, and then the first nut part 100 and the second nut part 200 are assembled together. Therefore, there is an effect that manufacturing of the present disclosure is easy comparing to forming threads on the outer circumferential surface of the space part 120 of the first nut part 100 in order to secure the effect described above.

That is, since the width of the space part 120 of the first nut part 100 is narrow, it is difficult to process and form threads on the outer circumferential surface of the space part 120, and the manufacturing cost is high. However, since first nut part 100 having the first fastening part 110 and the second nut part 200 having the second fastening part 210 are respectively manufactured in the present disclosure, manufacturing of the first nut part 100 and the second nut part 200 is easy and the manufacturing cost is reduced, and there is an effect that the use of the present disclosure is easy by rigidly assembling the first nut part 100 and the second nut part 200 to each other.

Meanwhile, since a support protrusion part 132 protrudes on the outer circumferential surface of the mounting part 130, there is an effect that a hand is prevented from slipping when the multi-joint nut 50 of the present disclosure is rotated, and there is an effect that a rotational force is more stably transmitted.

In addition, a first packing groove 112 and a second packing groove 114 may be respectively formed on an inner upper end and an outer upper end of the first fastening part 110.

A packing (not illustrated) for maintaining airtightness when the multi-joint nut 50 of the present disclosure is coupled to a fastening object such as a pump and so on may be coupled to such a first packing groove 112 and a second packing groove 114.

Therefore, according to the multi-joint nut 50 of the present disclosure as described above, the multi-joint nut 50 is configured such that the first nut part having the center portion provided with the first fastening part and the second nut part having the center portion provided with the second fastening part are coupled to each other, is easily manufactured and is configured such that the first nut part or the second nut part that matches the diameter of the coupling part of the fastening object is capable of being selectively coupled. Furthermore, the vertical groove part is formed in the first nut part and the vertical protrusion part is formed on the second nut part, so that the rotational force applied to the first nut part is capable of being transmitted to the second nut part since the vertical protrusion part is fitted and coupled to the vertical groove part when the first nut part and the second nut part are coupled to each other. Furthermore, the horizontal groove part is formed in the first nut part and the horizontal protrusion part is formed on the second nut part, so that the first nut part and the second nut part are capable of being rigidly coupled to each other as the horizontal protrusion part is fitted and coupled to the horizontal groove part when the first nut part and the second nut part are coupled to each other. Therefore, the present disclosure has various advantages as described above.

Although the embodiments described above are the exemplary embodiments of the present disclosure, the present disclosure is not limited to the embodiments, and it is obvious to those skilled in the art that various modifications are possible within the scope that does not deviate from the technical ideas of the present disclosure.

What is claimed is:

1. A multi-joint nut configured such that a corresponding first fastening part or a corresponding second fastening part is capable of being selected and fastened according to different diameters of inlet ports of a container in which a fluid is configured to be accommodated therein, the multi-joint nut comprising:
    a first nut part having a penetrated center portion and including:
        a first fastening part which has threads provided on an inner circumferential surface of the first fastening part,
        a mounting part which is spaced apart by a predetermined distance outside the first fastening part, and
        a hollow space formed between the first fastening part and the mounting part; and
    a second nut part formed in a ring shape and including a second fastening part which has threads provided on an inner circumferential surface of the second fastening part, wherein the second nut part is configured to be inserted into the hollow space of the first nut part and coupled to the first nut part,
    wherein an inner diameter of the second fastening part is greater than an inner diameter of the first fastening part,
    the first nut part has a plurality of vertical groove parts formed at a predetermined interval on an inner circumferential surface of the mounting part, and the second nut part has a plurality of vertical protrusion parts on an outer circumferential surface of the second nut part such that the plurality of vertical protrusion parts of the second nut part correspond to the vertical groove parts of the mounting part, and
    the first nut part has a plurality of horizontal groove parts formed at a predetermined interval on the inner circumferential surface of the mounting part, and the second nut part has a plurality of horizontal protrusion parts on the outer circumferential surface of the second nut part such that the plurality of horizontal protrusion parts of the second nut part correspond to the horizontal groove parts of the mounting part.

2. The multi-joint nut of claim 1, wherein a flange protrudes in a central axis direction on an upper end portion of the second nut part.

3. The multi-joint nut of claim 1, wherein the horizontal protrusion parts of the second nut part comprise inclined surfaces having a downward slope from top to bottom.

* * * * *